(No Model.)

W. S. HOW.
DENTAL DRILL.

No. 503,744.          Patented Aug. 22, 1893.

WITNESSES:          INVENTOR

UNITED STATES PATENT OFFICE.

WOODBURY STORER HOW, OF PHILADELPHIA, PENNSYLVANIA, ASSIGNOR TO THE S. S. WHITE DENTAL MANUFACTURING COMPANY, OF SAME PLACE.

DENTAL DRILL.

SPECIFICATION forming part of Letters Patent No. 503,744, dated August 22, 1893.

Application filed June 26, 1893. Serial No. 478,913. (No model.)

*To all whom it may concern:*

Be it known that I, WOODBURY STORER HOW, of Philadelphia, in the county of Philadelphia and State of Pennsylvania, have invented certain new and useful Improvements in Drills, of which the following is a specification.

The objects of my invention are to provide a boring implement or drill with a shank so constructed that in the event of the breaking of the shank in operation the cutting head of the implement will remain integral with a portion of the shank and with it may readily be removed from the substance being operated upon; and to render the shank suitably flexible in order that it may assume a working curvature.

The subject-matter deemed novel is hereinafter specifically claimed.

In the accompanying drawings which illustrate my improvements as embodied in a drill applicable to use in dental operations, Figure 1 is a longitudinal view of a suitable implement. Figs. 2 and 3 are views designed to illustrate operations of the implement; and Fig. 4 a view designed to illustate the operation of an implement of old and well known construction.

The drill head A and its long slender shank B are shown as provided with a driving shaft or carrier E by which the implement is adapted to be connected with and rotated by a dental engine in manner well understood. The drill head, which may be of any desired cutting shape, is of greater diameter than the shank at the junction, C, of the shank with the head. From its junction with the head the shank tapers or decreases in diameter inward for the greater portion of the length, say to the point D, and thence is increased in diameter to the size of the carrier E. By this construction it will be seen that in event of a breaking strain being exerted upon the tool in operation, the shank will give way at its weakest portion, D, remote from the drill head.

The relative proportions of the different portions of the implement, as illustrated and above described, may be varied to meet different requirements, the construction in this instance shown being that deemed best suited to the performance of certain dental operations, as farther on to be explained; and I do not wish to be understood as confining my invention to tools for the performance of any particular operations, as drills, reamers, &c., having shanks embodying my invention may be provided for many different uses.

Figure 1:
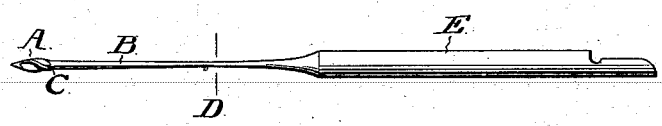
Figure 2:
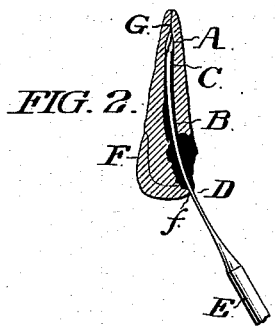
Fig. 2 shows in section a decayed human tooth F, the pulp canal G of which is to be enlarged by rotating within it the drill head A. The flexibility of the drill shank permits it to assume a working curvature in gaining access to the canal past the projecting corner *f* of the tooth crown.
Figure 3:
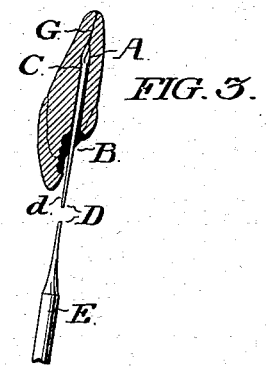
Fig. 3 shows in section a human tooth in the pulp canal G of which the drill head has become jammed, breaking the drill shank at its thinnest and weakest portion D outside the tooth. The projecting end *d* of that portion of the broken shank which remains integral with the drill head provides for the ready removal of the fragment of the drill from the tooth by means of pliers.
Figure 4:
Fig. 4 shows in section a tooth in the canal of which is the head A' of a drill having a shank H of well known old construction, with the shank broken at its thinnest diameter D' close to the drill head, thus leaving the drill head in a position from which it can be removed only by difficult drilling beside it, at the great risk of lateral perforation of the tooth root.

As will be obvious, the drill shank of novel form—tapering or gradually decreasing in diameter from the drill head to a point remote therefrom—produces increased flexibility as compared with the flexibility of the old form of shank which, as shown by Fig. 4, is thinnest adjacent to the drill head and increases in diameter away from the head. It will also be apparent that with any suitable boring or cutting head having the improved shank, the chips thrown to the rear by the advancing head have better clearance past the shank of decreasing diameter away from the head, than past a shank of the old form.

I claim as my invention—

A drill or boring implement having the shank of varying diameter and made thinnest at a point remote from the cutting head, substantially as set forth.

In testimony whereof I have hereunto subscribed my name.

WOODBURY STORER, HOW.

Witnesses:
W. SPENCE HARVEY,
EDW. F. SIMPSON, Jr.